United States Patent [19]

Nees et al.

[11] 4,113,477

[45] * Sep. 12, 1978

[54] METHOD OF TREATING LOW ANTIMONY ALLOY BATTERY GRID MATERIAL WITH PHOSPHORUS

[75] Inventors: John Nees, Wyomissing; Kenneth Pike, Reading, both of Pa.

[73] Assignee: General Battery Corporation, Reading, Pa.

[ * ] Notice: The portion of the term of this patent subsequent to Sep. 12, 1995, has been disclaimed.

[21] Appl. No.: 768,960

[22] Filed: Feb. 16, 1977

Related U.S. Application Data

[63] Continuation-in-part of Ser. No. 734,311, Oct. 20, 1976.

[51] Int. Cl.$^2$ .............................................. C22C 11/00

[52] U.S. Cl. .................................. 75/166 C; 429/245; 164/DIG. 1

[58] Field of Search ............. 75/166 R, 166 B, 166 C; 429/245; 164/DIG. 1

[56] References Cited

U.S. PATENT DOCUMENTS

| 842,801 | 1/1907 | Morrison | 75/166 B |
|---|---|---|---|
| 2,163,369 | 6/1939 | Betterton et al. | 75/166 B |
| 3,879,217 | 4/1975 | Peters | 75/166 C |

Primary Examiner—M. J. Andrews
Attorney, Agent, or Firm—Benasutti Associates, Ltd.

[57] ABSTRACT

A novel method is provided wherein the grain structure and castability of low antimony lead battery grid alloy is improved by treating that alloy with trace amounts of phosphorus, and more particularly red phosphorus.

6 Claims, No Drawings 4,113,477

METHOD OF TREATING LOW ANTIMONY ALLOY BATTERY GRID MATERIAL WITH PHOSPHORUS

RELATED APPLICATIONS

This application is a continuation-in-part of our prior co-pending patent application entitled, "Method Of Treating Low Antimony Battery Grid Material With Phosphorus," Ser. No. 734,311, filed Oct. 20, 1976, which application is hereby specifically incorporated by reference as if fully set forth herein.

BACKGROUND OF THE INVENTION

For many years it has been popular to add antimony to lead alloy which is eventually cast to produce battery grids. These grids essentially consist of a lattice of thin lead struts which are textured on their surfaces to subsequently engage and hold lead oxide pastes which are applied thereto. In the past, it has been known that approximately 3% antimony in a lead alloy is suitable to increase the strength of that alloy and to provide certain other characteristics which are desirable in battery grids. One of the disadvantages of utilizing such a percentage of antimony is that the antimony itself is an impurity with respect to the chemical reactions which take place in the battery, and therefore, the antimony content of the lead grids is responsible for numerous chemical or electro-chemical side effects which are undesirable.

In particular "high" percentages (i.e. about 3 wt-%) of antimony in lead alloys used to cast battery grids are believed to directly effect the amount of "gassing" which is experienced when a battery is subjected to overcharge conditions. Once a battery which has been discharged is charged to approach a "full charge" condition there will be a tendency for water in the sulfuric acid solution to disassociate through electrolysis into hydrogen ($H_2 \uparrow$) and oxygen ($O_2 \uparrow$) gas. This electrolysis is believed to be catalyzed directly in proportion to the amount of antimony, i.e. the percentage of antimony, which is contained in the grid alloy material.

Recently, attention has been directed by the battery industry to reducing the tendency of a battery to "gas" during overcharge conditions so that water need not be added to that battery during the normal operating life thereof. These batteries are now commonly referred to by the battery industry as "maintenance free" batteries.

Since the above described phenomena relating to antimony and its effects on "gassing" is well documented in the prior art, one common approach of the battery industry to reduce the "gassing" of a battery is the reduction or elimination of antimony from the battery grid alloy. For example, it has long been known that alloys with antimony contents in the range of 2.25-2.75 wt-% will reduce gassing while retaining other properties which produce suitable battery grids, particularly in lead alloys with other amounts of standard battery grid materials such as tin (0.25-0.50 wt-%), arsenic (0.01-0.5 wt-%), copper (0.01-0.08 wt-%), and sulfur (0.003-0.01 wt-%), (the remainder being lead). These alloys are generally known as "low-antimony" grid alloys and have exerienced limited success in the battery industry.

One of the problems which is encountered in casting with a relatively lower antimony battery grid alloys is that the surface tension of such an alloy is somewhat greater than the surface tension normally encountered with the higher antimony-containing lead alloys. Since surface tension is an important factor in filling the molds for relatively thin lattice - like grids, the use of low-antimony grid alloys, while reducing somewhat the degree of "gassing" of the battery, brings with it other difficulties which may adversely affect the manufacturing cost of the resultant grids and the quality of the end product produced therefrom.

SUMMARY OF THE INVENTION

The present invention provides a novel method for overcoming many of the problems which have plaqued the use of relatively low-antimony grid alloys. Accordingly, the method of the present invention improves the castability and resultant grain structure and resistance to cracking of grids made from such alloys. According to the preferred embodiment, a conventional low-antimony lead alloy having between 2.25 and 2.75% antimony (with minor amounts of other standard battery grid materials) is pretreated in the molten condition prior to casting by adding small amounts of red phosphorus to the molten alloy. This treating is believed to have the effect of refining the grain structure of the resultant battery grid, of providing better resistance to cracking, and of reducing the surface tension of the battery grid alloy so that upon casting the battery grid alloy will more easily fill all of the interstices of a conventional battery grid mold. Accordingly, the primary object of the present invention is the provision of a treating method wherein red phosphorus is utilized to increase the castability of a low-antimony lead battery grid alloy. Another object of the present invention is the provision of a method of treating a low-antimony battery grid alloy to refine the grain structure of the resultant battery grid, and to provide better resistance to cracking of the resultant battery grid.

DESCRIPTION OF THE PREFERRED EMBODIMENTS

Although specific forms of the invention have been selected for illustrations and the following description is drawn in specific terms for the purpose of describing these forms of the invention, this description is not intended to limit the scope of the invention which is defined in the appended claims.

In the preferred embodiment, an amount of phosphorus, and preferably red phosphorus, is introduced into molten battery grid alloy, preferably by introducing said phosphorus across the surface of said alloy. The amount of phosphorus preferred is approximately 5 pounds to a standard 50 ton kettle of molten battery grid alloy. While 5 pounds is preferred, the amount of red phosphorus which may be added ranges from between 1 to 10 pounds per 50 ton kettle. Higher amounts may be introduced into the alloy to obtain the above described effects, but are not necessary or preferred due to possible interference with other batter grid characteristics, and particularly those produced by the minor amounts of other standard battery grid materials present in such alloys such as tin, arsenic, copper and sulfur. Somewhat more than 10 pounds per 50 ton kettle may, therefore, be utilized provided the amount of red phosphorus introduced is sufficient to produce superior castability (i.e. lower surface tension), better grain refinement or a greater resistance to cracking of the final battery grid, without adversely affecting the aforementioned characteristics imparted by other grid alloy additives. In any event, it is believed that at the time of addition the amount of red phosphorus added should preferably represent 0.001 to 0.010% by weight of the alloy to which said phosphorus is added, and more preferably the amount of phosphorus to be added is approximately 0.005 wt-% of said alloy. In the event standard battery processes are not conducted which have the effect of mixing said phosphorus into said alloy, auxiliary mixing should be employed to agitate the molten alloy to ensure complete dispersion of the phosphorus through the alloy. Casting of the battery grids is then conducted utilizing conventional molding or casting equipment, which need not be modified to handle this relatively low-antimony alloy. Grids are produced with refined grain structures and superior resistance to cracking.

While the amounts indicated above represent the amount of phosphorus added to the molten battery grid alloy, it is not presently known whether or not any of the phosphorus actually remains in and is incorporated in the lead alloy, or whether the red phosphorus acts only as a catalytic or cleaning agent which is not incorporated in the final alloy structure. In any event, due to the small percentages of phosphorus utilized in the method of the present invention, and the difficulty of determining the existance of such amounts of phosphorus in the final end product, it is not anticipated by the present invention that any measurable amount of phosphorus need be obtained in the final battery grid, provided the method of the present invention has been followed to treat the alloy prior to the casting of said battery grids.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United Stated Patent and Trademark Office, and is not intended to limit the scope of the invention described and claimed herein.

What is claimed is:

1. A method of treating a low-antimony battery grid lead alloy prior to casing comprising the steps of:
   (a) bringing said alloy into a molten state; and
   (b) adding between 0.001 to 0.010 wt-% of phosphorus to said molten alloy,
said alloy comprising between 2.25 and 2.75% antimony.

2. The invention of claim 1 wherein said alloy further comprises between 0.25 and 0.50 wt-% tin, between 0.01 and 0.08 wt-% copper, between 0.003 and 0.01 wt-% sulfur, and between 0.01–0.05 wt-% arsenic.

3. A method of increasing the castability of low-antimony battery grid alloy and for refining the grain structure of and increasing the resistance to cracking of battery grids cast therefrom, comprising the steps of:
   (a) bringing a fifty ton kettle of 2.25 to 2.75 wt-% antimony-containing lead alloy into the molten state; and
   (b) introducing between one and five pounds of phosphorus into said kettle over the surface of said alloy to treat said alloy prior to using said alloy to cast said battery grids.

4. The invention of claim 3 wherein the weight of phosphorus added to said molten material is approximately 5 pounds.

5. The invention of claim 3 wherein said phosphorus is red phosphorus.

6. The invention of claim 3 wherein said alloy further comprises between 0.25 and 0.50 wt-% tin, between 0.01 and 0.08 wt-% copper, between 0.003 and 0.01 wt-% sulfur, between 0.01 and 0.5 wt-% arsenic, with the remainder of said alloy being lead.

* * * * *